United States Patent
Weiss et al.

(10) Patent No.: US 7,632,172 B2
(45) Date of Patent: Dec. 15, 2009

(54) HARD FINISHING MACHINE

(75) Inventors: Bernd Weiss, Roedental (DE);
Friedrich Woelfel, Coburg (DE)

(73) Assignee: Kapp GmbH, Coburg (DE)

( * ) Notice: Subject to any disclaimer, the term of this patent is extended or adjusted under 35 U.S.C. 154(b) by 0 days.

(21) Appl. No.: 12/118,559

(22) Filed: May 9, 2008

(65) Prior Publication Data

US 2008/0280543 A1    Nov. 13, 2008

(30) Foreign Application Priority Data

May 12, 2007    (DE) .................. 10 2007 022 603

(51) Int. Cl.
*B24B 9/02* (2006.01)
*B24B 53/12* (2006.01)

(52) U.S. Cl. ................ 451/72; 451/47; 451/253; 451/339; 451/451

(58) Field of Classification Search ............. 451/47, 451/49, 56, 57, 72, 332, 339, 443, 253
See application file for complete search history.

(56) References Cited

U.S. PATENT DOCUMENTS

| 6,095,899 A * | 8/2000 | Elmar et al. ............. 451/28 |
| 6,120,358 A * | 9/2000 | Porter ........................ 451/57 |
| 6,257,966 B1 * | 7/2001 | Ishikawa et al. ............. 451/67 |
| 6,846,224 B2 * | 1/2005 | Ki ............................... 451/9 |
| 2002/0081954 A1 * | 6/2002 | Mori et al. .................. 451/65 |

FOREIGN PATENT DOCUMENTS

| DE | 196 41 534 | 4/1998 |
| DE | 198 57 592 | 9/2000 |
| DE | 199 10 746 | 9/2000 |
| DE | 100 16 897 | 10/2001 |
| DE | 10 2005 043 602 | 3/2007 |
| EP | 0 904 878 | 3/1999 |

* cited by examiner

*Primary Examiner*—Timothy V Eley
(74) *Attorney, Agent, or Firm*—Lucas & Mercanti, LLP

(57) ABSTRACT

The invention relates to a hard finishing machine (1). The machine has one tool (4) which is arranged on a tool spindle (3) and a rotary table (5) with an axis of rotation (6) which is aligned vertically, and a workpiece spindle (7) arranged on the rotary table (5) which carries the workpiece (2). To increase the flexibility of the machine, the rotary table (5) has a first rotational position (I) in which the workpiece (2) can be machined by the tool (4), a second rotational position (II) where the workpiece is loaded on the workpiece spindle (7) at a first station (8), and a third rotational position (III) where the workpiece is unloaded at a second station (9).

14 Claims, 7 Drawing Sheets

HARD FINISHING MACHINE

Figure 1:
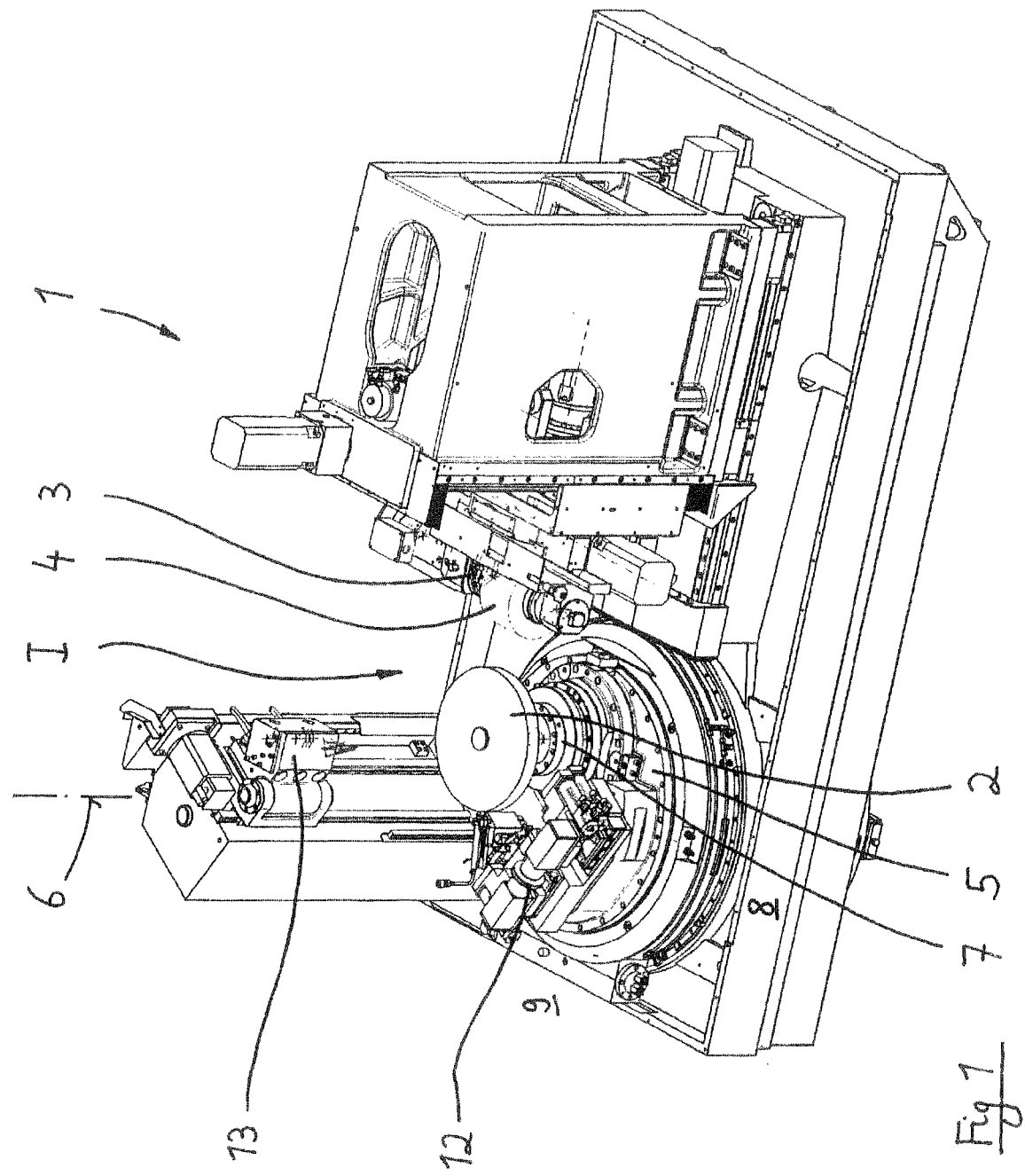

The invention relates to a hard finishing machine for hard finishing of a workpiece which has a profile to be machined, wherein the machine has at least one tool which is arranged on at least one tool spindle and a rotary table with an axis of rotation which is aligned vertically and wherein a workpiece spindle is arranged on the rotary table which carries the workpiece.

Especially in the production of gears or workpieces which have a gearing or a profile the final hard finishing process has a major relevance. During this process the flanks of the tooth are machined e.g. by a grinding operation to bring them to the exact contour.

An effective method for the production of a gear is the method of generative grinding by means of a grinding worm. Here, the gear to be machined is engaged with the grinding worn, so that a stock on the flanks of the tooth is taken away by the abrasive material of the grinding worm.

Alternatively, the profile grinding method is known, in which the grinding wheel has a profile which is the counter-profile of the tooth profile to be grinded.

In the practice sometime very different requirements are given. In the long run work big and very big lot sizes are to be machined by hard finishing. Here, a degree of automatization is of importance which should be as high as possible. Especially it is aimed in this case that the auxiliary process time is as short as possible to reach a utilization of the machine which is as high as possible. Consequently, it is known to employ loading and unloading systems to optimize the loading process of the machine with workpieces as well as the removal of finish workpieces.

On the other hand, the lot size can also be very small up to the situation that only single workpieces and workpieces in very small batches respectively are to be machined.

Due to economical reasons and specifically due to the relatively high costs for the investment it is not possible in many cases to make special machines available for the different tasks. Rather, it must be possible with a few machines only to accomplish the miscellaneous tasks with different lot sizes.

It is an object of the present invention to further develop a hard finishing machine of the type mentioned above, especially a grinding machine, so that is becomes possible to accomplish different machining tasks with respect to the lot size in an effective and economical way. Thus, the hard finishing machine should be applicable universally for very different lot sizes of workpieces.

The solution of this object according to the invention is characterized in that the rotary table has a first rotational position in which the workpiece can be machined by the tool, that the rotary table has a second rotational position in which the workpiece can be taken from or loaded on the workpiece spindle at a first loading and unloading station and that the rotary table has a third rotational position which is different from the second rotational position in which the workpiece can be taken from or loaded on the workpiece spindle at a second loading and unloading station.

Preferably, one of the loading and unloading stations is arranged for manually loading and unloading of the workpiece spindle. Therefore, a door can be arranged in front of the hard finishing machine at the second rotational position by which the entrance to the machining chamber is closable. Preferably, the second rotational position is pivoted relatively to the first rotational position by 90°.

One of the loading and unloading stations is preferably arranged for automatically loading and unloading of the workpiece spindle. A loading and unloading system can be arranged in front of the hard finishing machine in the third rotational position. The third rotational position is preferably pivoted relatively to the first rotational position by 180°.

The axis of the workpiece spindle is preferably arranged vertically.

According to a preferred embodiment the hard finishing machine is a grinding machine, wherein the tool is a dressable grinding tool and wherein at a defined circumferential position of the rotary table at least on dressing tool is arranged which can be brought into engagement with the grinding tool. The dressing tool can be arranged on a one-spindle, on a two-spindle or on a three-spindle dressing device. Consequently, the dressing tool is designed for a respective dressing device.

For supporting of shaft-like workpieces a tailstock can be arranged on the rotary table at a defined circumferential position.

Furthermore, a further dressing tool with a straight or arcuated dressing edge can be arranged on the rotary table at a defined circumferential position. Preferably, the further dressing tool can be arranged on the tailstock.

The grinding tool can be a profile grinding wheel for the grinding of a gear by the method of profile grinding. But it is also possible, that the grinding tool is a single-thread or a multiple-thread grinding worm for grinding of a gear by the method of generative grinding.

By this design it becomes possible to apply the hard finishing machine in a flexible way with respect to the lot size of the workpieces to be machined, Optionally and alternatively a manual or an automated loading of the machine with workpieces can be provided, Especially, the described machine concept is also well applicable for the manual loading with heavy workpieces. So, small as well as big lot sizes can be machined effectively and economically, wherein the requirements for investments for machines can be optimized, to obtain a more economical production process.

In the drawings an embodiment of the invention is illustrated.

Figure 2:
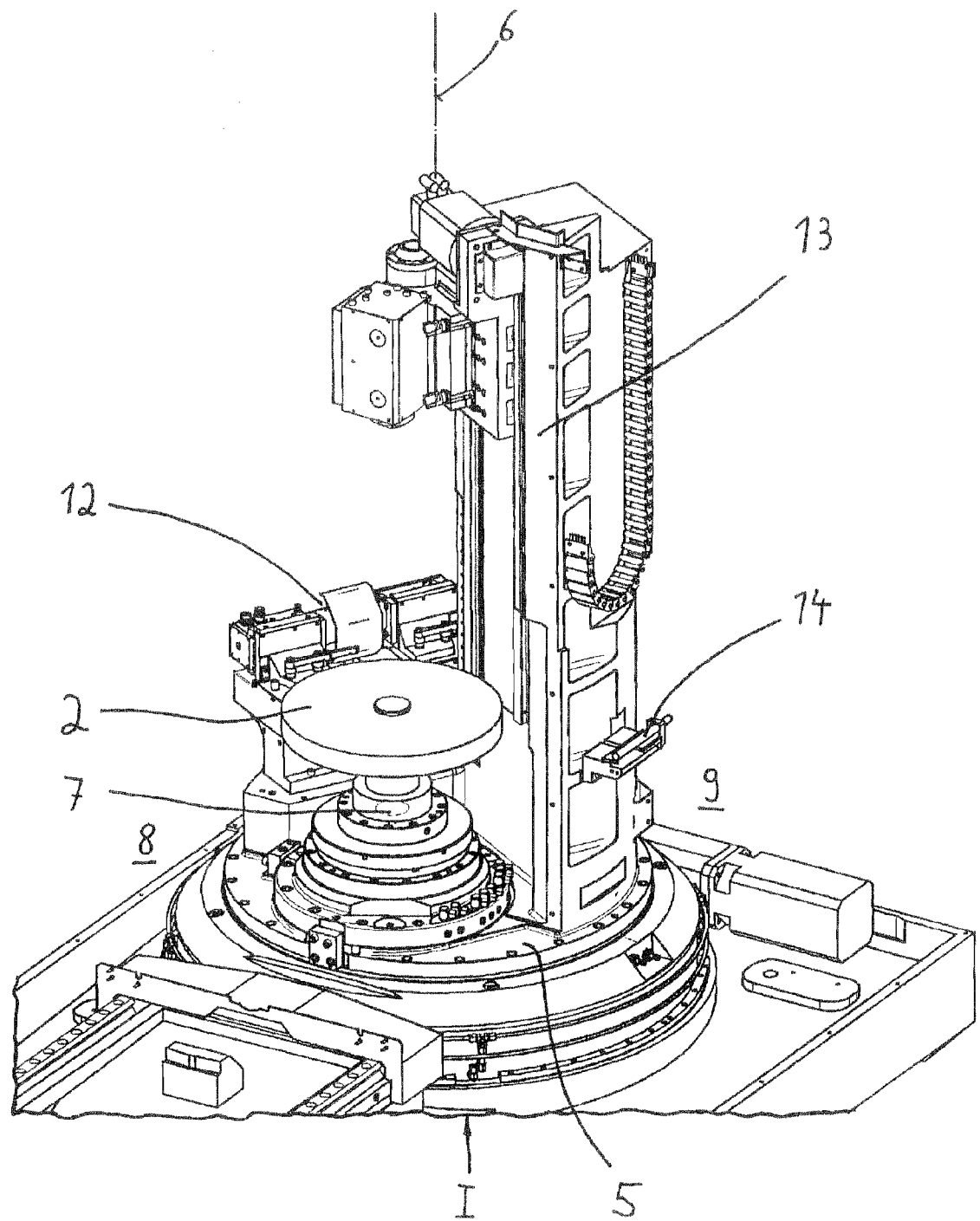
Figure 3:
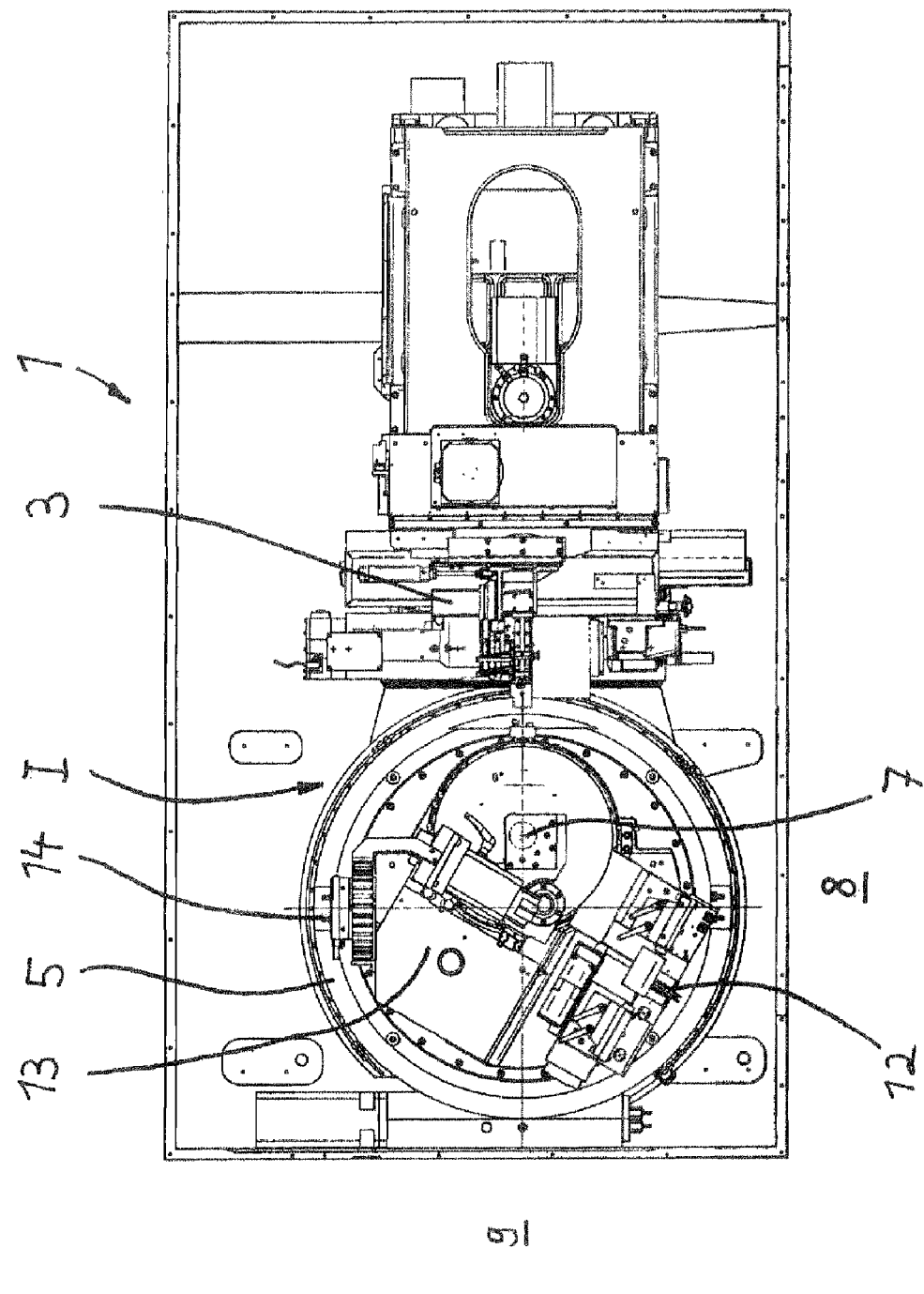
Figure 4:
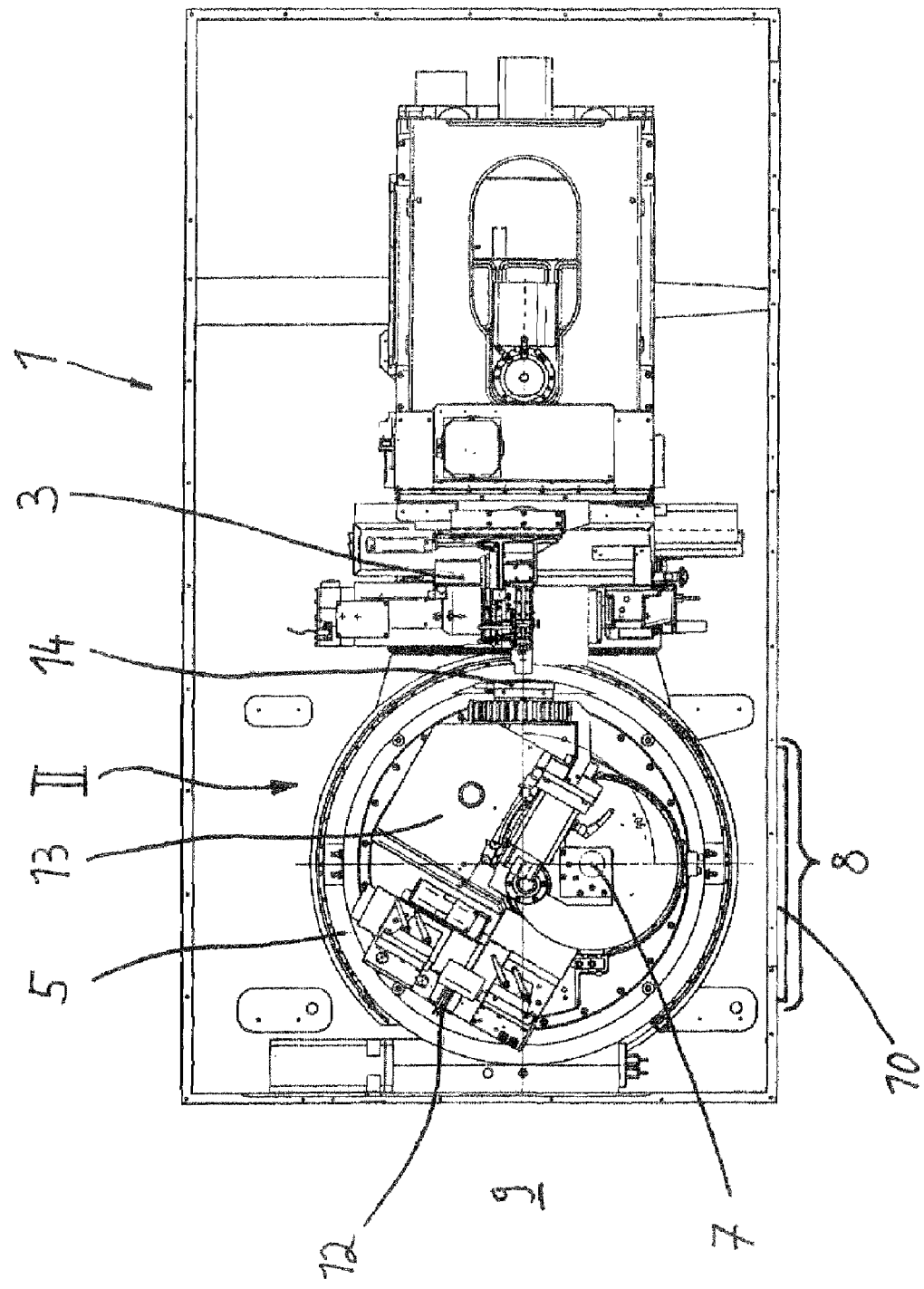
Figure 5:
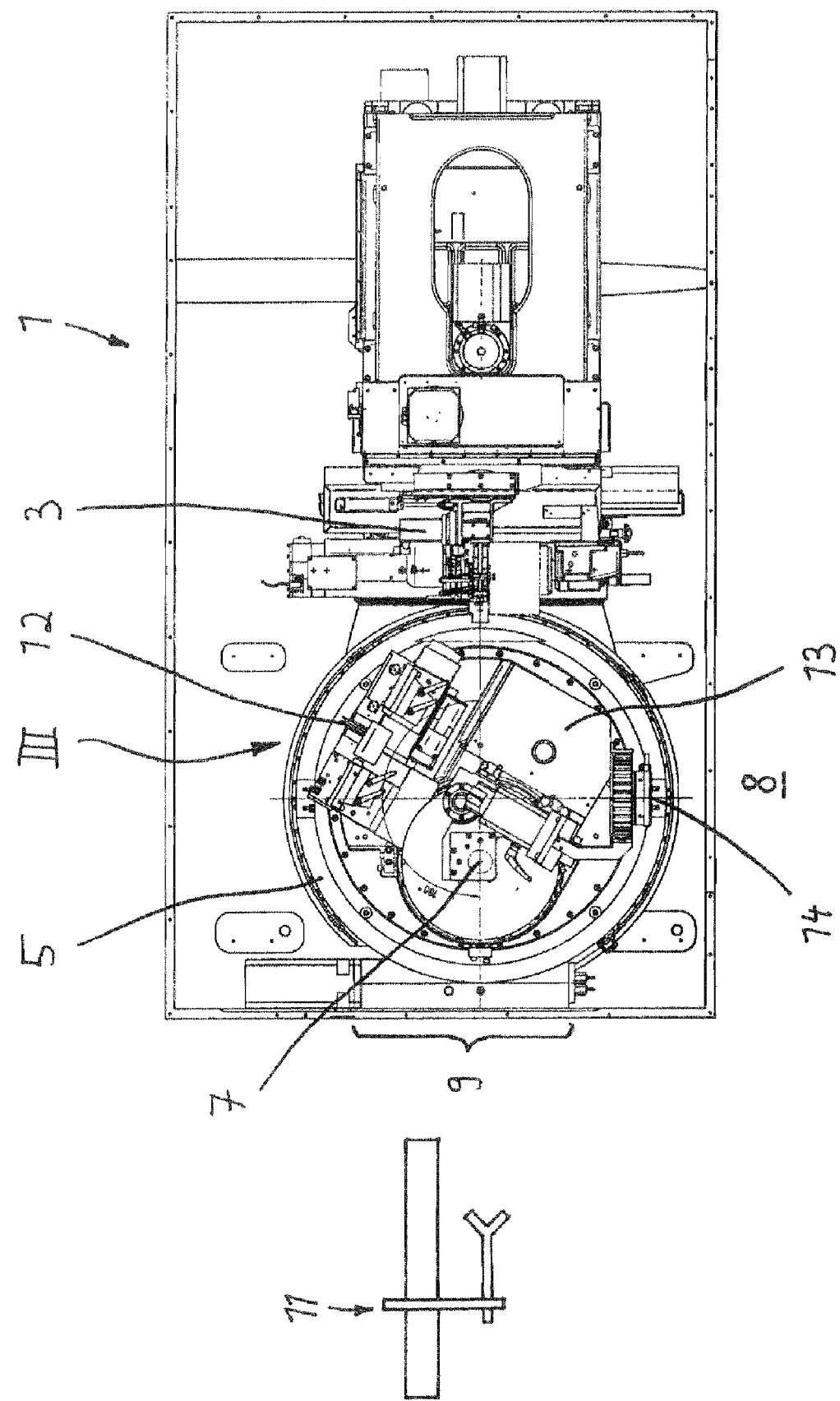
Figure 6:
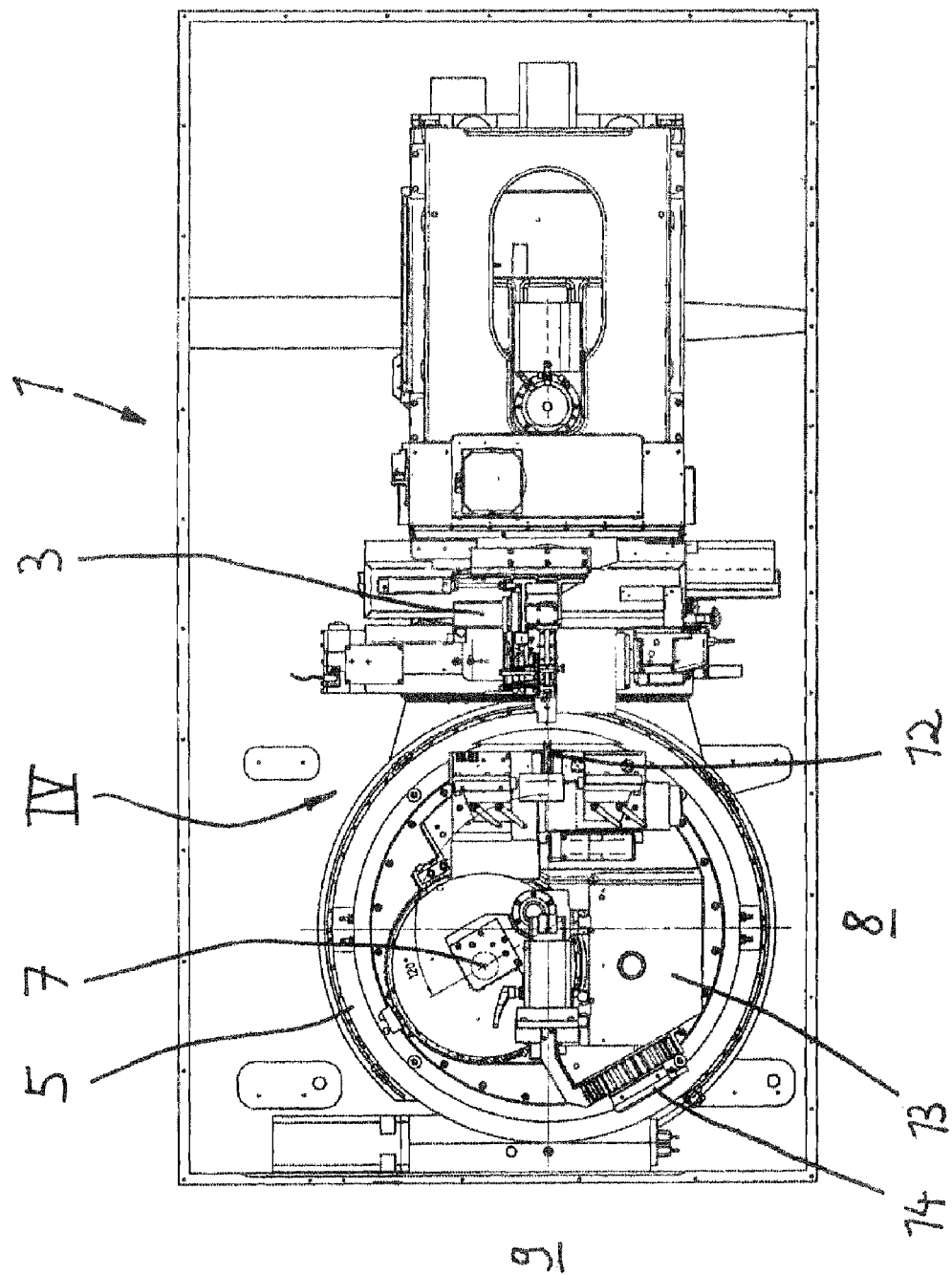
Figure 7:
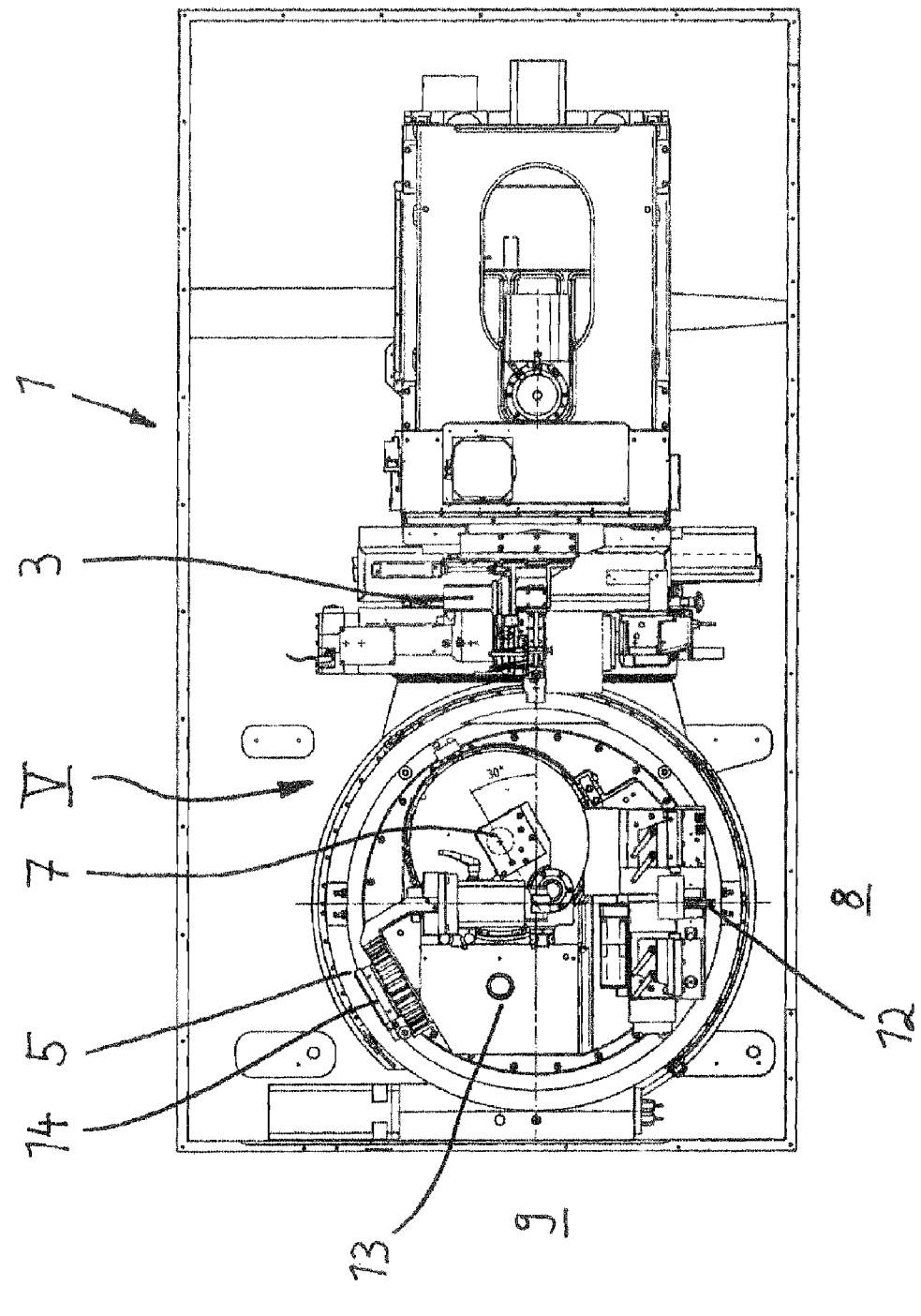

FIG. 1 shows a perspective view of the machining chamber of a hard finishing machine which is a gear grinding machine with a rotary table, FIG. 2 shows an enlarged view of the rotary table, seen from another perspective as in FIG. 1, FIG. 3 shows a top view of the arrangement according to FIG. 1, wherein the rotary table is in a first position of rotation FIG. 4 shows a top view of the arrangement according to FIG. 1, wherein the rotary table is in a second position of rotation, FIG. 5 shows a top view of the arrangement according to FIG. 1, wherein the rotary table is in a third position of rotation, FIG. 6 shows a top view of the arrangement according to FIG. 1, wherein the rotary table is in a fourth position of rotation, and FIG. 7 shows a top view of the arrangement according to FIG. 1, wherein the rotary table is in a fifth position of rotation.

In FIG. 1 the machining chamber of a gear grinding machine 1 is depicted, which has a tool spindle 3 as an essential component, on which a grinding tool 4—here: a grinding worm—is arranged, as well as a rotary table 5 with a vertically aligned axis of rotation 6, on which a workpiece spindle 7 is arranged which supports a workpiece 2.

Although a gear grinding machine is depicted here, the present invention can be used for any hard finishing machine, which machines profiled workpieces 2, which are specifically—but not exclusively—gears.

As can be seen best in FIG. 2, the rotary table 5 has several stations, which can be brought into working position by a respective rotation of the rotary table 5. Firstly, the workpiece spindle 7 with vertical axis of rotation is arranged on the rotary table 5, wherein the axis of rotation of the workpiece spindle and the axis of rotation 6 of the rotary table are parallel but spaced from another. The location at the circumference of the workpiece 2 to be machined can be brought into machining position by a respective actuation of the workpiece spindle 7, which is sufficiently known as such. Furthermore, a tailstock 13 is arranged on the rotary table 5, which is used also in a known manner to support shaft-like workpieces 2.

Because a dressable grinding tool is applied in the embodiment, a dressing tool 12 is arranged on the rotary table 5. This can be one, two or three dressing wheels, which can be moved to the grinding tool 4 in such a manner that a desired profile is given to the tool 4.

A further dressing tool 14 in the form of a dressing bar is arranged at the tailstock 13. When dressing a grinding worm the tip region of the grinding worm can be dressed by a single dressing step completely by means of the dressing bar, wherein the dressing bar—being parallel to the axis of rotation of the grinding worm—dips radially by a defiled amount. For this purpose the length of the dressing bar is preferably at least the width of the grinding tool 4.

It is essential that for the rotary table 5 at least three different positions are provided in which it can be positioned:

In a first rotational position I—depicted in FIG. 3—the workpiece 2 can be machined by the grinding tool 4, i.e. this position is the regular working position of the machine.

In a second working position II—depicted in FIG. 4—the rotary table 5 is in a position in which the workpiece 2 can be taken from the workpiece spindle 7 at a first loading and unloading station 8 of the machine 1 or it can be clamped on it. The rotary table 5 positions the workpiece spindle 7 in the rotational position II close to a door 10, which closes the machining chamber of the hard finishing machine 1. After the door 10 is opened the workpiece 2 can be taken out manually in the rotational position II and a new workpiece can be put on the workpiece spindle 7 respectively.

Due to the arrangement of the tailstock 13 with the dressing bar 14 (tip dresser) it is possible that furthermore the tip region of the grinding worm can be dressed in the rotational position II.

In a third rotational position III—depicted in FIG. 5—the rotary table 5 is in a position in which the workpiece 2 can be taken from the workpiece spindle 7 at a second loading and unloading station 9 or it can be clamped on it. The rotary table 5 positions the workpiece spindle 7 in the rotational position III in a lateral region of the machine 1. Here, a loading and unloading system 11 is located, which automatically takes completely machined workpieces 2 from the workpiece spindle 7 and puts new workpieces to be machined on the spindle 7.

Furthermore it is also possible in the third rotational position III to set tip the further dressing tool (dressing bar) via the first loading and unloading station 8.

So, it becomes evident that optionally the first loading and unloading station 8 is moved forward according to the control by a machine controller which controls the actuation of the rotary table, to manually handle the workpiece, or that the second loading and unloading station 9 is moved forward, to carry out a fully automated handling of the workpieces.

A furthers possible fourth rotational position IV can be seen in FIG. 6. Here, the dressing tool 12 is brought into position to dress the grinding tool.

The possible fifth rotational position V which is depicted in FIG. 7 is useful to set up the dressing tool 12 at the first loading and unloading station 8.

LIST OF REFERENCE NUMERALS

1 Hard finishing machine (grinding machine)
2 Workpiece
3 Tool spindle
4 Tool (grinding tool)
5 Rotary table
6 Axis of rotation
7 Workpiece spindle
8 First loading and unloading station
9 Second loading and unloading station
10 Door
11 Loading and unloading system
12 Dressing tool
13 Tailstock
14 Further dressing tool (dressing bar/dressing spacer)
I First rotational position
II Second rotational position
III Third rotational position
IV Fourth rotational position
V Fifth rotational position

The invention claimed is:

1. A hard finishing machine for hard finishing of a workpiece which has a profile to be machined, comprising:
    a dressable grinding tool which is arranged on a tool spindle;
    a rotary table with a vertical axis of rotation;
    a workpiece spindle arranged on the rotary table for carrying the workpiece, wherein
    the rotary table has a first rotational position in which the workpiece can be machined by the tool,
    the rotary table has a second rotational position in which the workpiece can be taken from or loaded on the workpiece spindle at a first loading and unloading station, and
    the rotary table has a third rotational position, which is different from the second rotational position, in which the workpiece can be taken from or loaded on the workpiece spindle at a second loading and unloading station; and
    a dressing tool arranged on the rotary table at a circumferential position for engaging the grinding tool,
    the grinding tool being (i) a profile grinding wheel for grinding of a gear by profile grinding, or (ii) a single-threaded grinding worm for grinding of a gear by generative grinding, or (iii) a multiple-thread grinding worm for grinding of a gear by generative grinding.

2. The hard finishing machine of claim 1, wherein one of the loading and unloading stations is arranged for manually loading and unloading of the workpiece spindle.

3. The hard finishing machine of claim 2, wherein a machining chamber encloses the machine and a door is arranged in the chamber, in front of the machine, at the second rotational position by which an entrance to the machining chamber is closable.

4. The hard finishing machine of claim 2, wherein the second rotational position is pivoted by 90° relatively to the first rotational position.

5. The hard finishing machine of claim 1, wherein one of the loading and unloading stations is arranged for automatically loading and unloading of the workpiece spindle.

6. The hard finishing machine of claim 5, wherein a loading and unloading system is arranged in front of the machine at the third rotational position.

7. The hard finishing machine of claim 5, wherein the third rotational position is pivoted by 180° relatively to the first rotational position.

8. The hard finishing machine of claim 1, wherein the workpiece spindle has a vertical axis.

9. The hard finishing machine of claim 1, wherein the dressing tool is arranged on a one-spindle dressing device.

10. The hard finishing machine of claim 1, wherein the dressing tool is arranged on a two-spindle dressing device.

11. The hard finishing machine of claim 1, wherein the dressing tool is arranged on a three-spindle dressing device.

12. The hard finishing machine of claim 1, wherein a tailstock is arranged on the rotary table at a circumferential position.

13. The hard finishing machine of claim 1, wherein a further dressing tool with a straight or arcuated dressing edge is arranged on the rotary table at a circumferential position.

14. The hard finishing machine of claim 12, wherein a further dressing tool is arranged on the tailstock.

* * * * *